United States Patent
Howarter et al.

(10) Patent No.: US 8,819,182 B2
(45) Date of Patent: Aug. 26, 2014

(54) SYSTEM AND METHOD FOR UPDATING VEHICLE MEDIA CONTENT

(75) Inventors: Jamie C. Howarter, Overland Park, KS (US); Richard G. Bradford, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 779 days.

(21) Appl. No.: 12/237,097

(22) Filed: Sep. 24, 2008

(65) Prior Publication Data

US 2010/0077094 A1    Mar. 25, 2010

(51) Int. Cl.
| | |
|---|---|
| G06F 15/16 | (2006.01) |
| H04N 21/00 | (2011.01) |
| H04N 7/18 | (2006.01) |
| G06F 17/30 | (2006.01) |
| H04N 21/414 | (2011.01) |
| H04L 29/08 | (2006.01) |
| H04L 29/06 | (2006.01) |

(52) U.S. Cl.
CPC .... G06F 17/30017 (2013.01); H04N 21/41422 (2013.01); H04L 67/12 (2013.01); H04L 29/06027 (2013.01)
USPC .............................. 709/219; 725/75; 348/148

(58) Field of Classification Search
CPC ... H04L 67/06; H04L 67/12; H04L 29/06027; H04N 21/41422; G06F 17/30017–17/30064
USPC ........................ 709/201–207, 213–219, 248; 701/537–541; 725/74–77; 348/148
See application file for complete search history.

(56) References Cited

U.S. PATENT DOCUMENTS

| | | | |
|---|---|---|---|
| 5,146,215 A | 9/1992 | Drori | |
| 5,386,713 A | 2/1995 | Wilson | |
| 5,673,948 A | 10/1997 | Karpisek | |
| 5,693,987 A | 12/1997 | Krucoff | |
| 5,712,969 A | 1/1998 | Zimmermann et al. | |
| 5,768,539 A | 6/1998 | Metz et al. | |
| 5,790,015 A | 8/1998 | Iitsuka | |
| 5,801,753 A | 9/1998 | Eyer et al. | |

(Continued)

FOREIGN PATENT DOCUMENTS

JP    2008-112241 A    5/2008

OTHER PUBLICATIONS

Non-Final Office Action date mailed Aug. 31, 2010 for U.S. Appl. No. 11/897,643.
Response filed Nov. 30, 2010 for U.S. Appl. No. 11/897,643.

(Continued)

*Primary Examiner* — Patrice Winder
*Assistant Examiner* — Julian Chang
(74) *Attorney, Agent, or Firm* — Swanson & Bratschun, L.L.C.

(57) ABSTRACT

A system and method for updating media content for a vehicle. Media content for a vehicle is received through a home network. The media content is stored for playback by one or more devices of the vehicle. A selection of additional media content available through the home network listed in an index is received. The additional media content selected from the index is queued for download based on access to an available network. An available network is searched for. The additional media content is downloaded to the vehicle through the available network and the home network in response to detecting the available network.

20 Claims, 6 Drawing Sheets

(56) References Cited

U.S. PATENT DOCUMENTS

| | | | |
|---|---|---|---|
| 5,852,944 A | 12/1998 | Collard, Jr. et al. | |
| 5,894,320 A | 4/1999 | Vancelette | |
| 5,931,908 A | 8/1999 | Gerba et al. | |
| 5,937,065 A | 8/1999 | Simon et al. | |
| 5,940,072 A | 8/1999 | Jahanghir et al. | |
| 5,960,445 A | 9/1999 | Tamori et al. | |
| 5,978,855 A | 11/1999 | Metz et al. | |
| 6,040,851 A | 3/2000 | Cheng et al. | |
| 6,046,760 A | 4/2000 | Jun | |
| 6,075,863 A | 6/2000 | Krishnan et al. | |
| 6,088,051 A | 7/2000 | Barraud | |
| 6,138,271 A | 10/2000 | Keeley | |
| 6,175,861 B1 | 1/2001 | Williams, Jr. et al. | |
| 6,195,797 B1 | 2/2001 | Williams, Jr. | |
| 6,202,211 B1 | 3/2001 | Williams, Jr. | |
| 6,246,434 B1 | 6/2001 | Takashima | |
| 6,256,785 B1 | 7/2001 | Klappert et al. | |
| 6,259,443 B1 | 7/2001 | Williams, Jr. | |
| 6,331,876 B1 | 12/2001 | Koster et al. | |
| 6,347,294 B1 | 2/2002 | Booker et al. | |
| 6,424,947 B1 | 7/2002 | Tsuria et al. | |
| 6,469,742 B1 | 10/2002 | Trovato et al. | |
| 6,614,470 B1 | 9/2003 | Manowitz et al. | |
| 6,618,754 B1 | 9/2003 | Gosling | |
| 6,624,758 B1 | 9/2003 | Omata et al. | |
| 6,637,029 B1 | 10/2003 | Maissel et al. | |
| 6,654,835 B1 | 11/2003 | Foster et al. | |
| 6,681,393 B1 | 1/2004 | Bauminger et al. | |
| 6,684,403 B1 | 1/2004 | Barraud | |
| 6,690,259 B2 | 2/2004 | Aslanidis et al. | |
| 6,895,595 B2 | 5/2005 | Goodman et al. | |
| 6,907,252 B2 | 6/2005 | Papadias et al. | |
| 6,917,801 B2 | 7/2005 | Witte et al. | |
| 6,970,641 B1 | 11/2005 | Pierre et al. | |
| 6,978,152 B1 * | 12/2005 | Yamaashi et al. | 455/526 |
| 7,003,783 B2 | 2/2006 | Skaringer et al. | |
| 7,027,768 B2 | 4/2006 | Hill | |
| 7,042,516 B2 | 5/2006 | Moriya et al. | |
| 7,069,578 B1 | 6/2006 | Prus et al. | |
| 7,072,950 B2 | 7/2006 | Toft | |
| 7,124,194 B2 | 10/2006 | Nathan et al. | |
| 7,200,683 B1 | 4/2007 | Wang et al. | |
| 7,383,056 B2 | 6/2008 | Matsubara et al. | |
| 7,437,183 B2 | 10/2008 | Mäkinen | |
| 7,502,687 B2 | 3/2009 | Flick | |
| 7,683,757 B2 | 3/2010 | King et al. | |
| 7,725,077 B2 | 5/2010 | Jung et al. | |
| 7,769,756 B2 * | 8/2010 | Krikorian et al. | 707/736 |
| 7,796,965 B2 | 9/2010 | Moser et al. | |
| 2002/0046285 A1 * | 4/2002 | Yasushi et al. | 709/228 |
| 2002/0164973 A1 * | 11/2002 | Janik et al. | 455/403 |
| 2003/0100299 A1 | 5/2003 | Ko et al. | |
| 2004/0185842 A1 * | 9/2004 | Spaur et al. | 455/420 |
| 2004/0203345 A1 | 10/2004 | Tehrani | |
| 2004/0242198 A1 * | 12/2004 | Oyagi et al. | 455/411 |
| 2005/0013592 A1 * | 1/2005 | Umemura et al. | 386/96 |
| 2005/0083211 A1 | 4/2005 | Shafir et al. | |
| 2005/0233749 A1 * | 10/2005 | Karaoguz et al. | 455/442 |
| 2006/0004788 A1 * | 1/2006 | Pilgrim et al. | 707/100 |
| 2006/0167985 A1 * | 7/2006 | Albanese et al. | 709/203 |
| 2007/0038647 A1 * | 2/2007 | Thomas et al. | 707/100 |
| 2007/0085658 A1 | 4/2007 | King et al. | |
| 2007/0130585 A1 * | 6/2007 | Perret et al. | 725/46 |
| 2007/0222638 A1 | 9/2007 | Chen et al. | |
| 2007/0234213 A1 * | 10/2007 | Krikorian et al. | 715/716 |
| 2008/0034422 A1 | 2/2008 | Al-Azzawi | |
| 2008/0059533 A1 * | 3/2008 | Krikorian | 707/104.1 |
| 2008/0071882 A1 * | 3/2008 | Hering et al. | 709/217 |
| 2008/0163307 A1 * | 7/2008 | Coburn et al. | 725/61 |
| 2008/0229372 A1 * | 9/2008 | White | 725/91 |
| 2008/0232371 A1 * | 9/2008 | Hildreth et al. | 370/392 |
| 2008/0268791 A1 * | 10/2008 | Shteyn | 455/73 |
| 2008/0301262 A1 * | 12/2008 | Kinoshita et al. | 709/219 |
| 2008/0320558 A1 * | 12/2008 | Imanishi et al. | 726/2 |
| 2009/0049399 A1 * | 2/2009 | White | 715/781 |
| 2009/0077046 A1 * | 3/2009 | Narahara et al. | 707/3 |
| 2009/0081947 A1 * | 3/2009 | Margis | 455/3.02 |
| 2009/0158148 A1 * | 6/2009 | Vellanki et al. | 715/700 |
| 2009/0248235 A1 * | 10/2009 | Hering et al. | 701/31 |
| 2009/0282020 A1 * | 11/2009 | McSheffrey et al. | 707/5 |
| 2010/0041397 A1 * | 2/2010 | Chutorash et al. | 455/432.1 |
| 2010/0049626 A1 * | 2/2010 | Hong et al. | 705/26 |
| 2011/0061109 A1 * | 3/2011 | Austin et al. | 726/27 |

OTHER PUBLICATIONS

Notice of Allowance date mailed Dec. 28, 2010 for U.S. Appl. No. 11/897,643.
Amendment Rule 312 after Notice of Allowance dated mailed Feb. 25, 2011 for U.S. Appl. No. 11/897,643.
Response to Amendment Rule 312 filed Mar. 11, 2011 for U.S. Appl. No. 11/897,643.
Non-Final Office Action date mailed Dec. 9, 2010 for U.S. Appl. No. 12/237,149.
Response filed Mar. 9, 2011 for U.S. Appl. No. 12/237,149.
Non-Final Office Action date mailed Dec. 23, 2010 for U.S. Appl. No. 12/237,122.
Response filed Mar. 23, 2011 for U.S. Appl. No. 12/237,122.

* cited by examiner

FIG. 6

| User interface 600 |
|---|

602
- Username: LLester
- Password: ********

604
- Currently connected to: StarBN3 | Signal strength: Good 7 of 10

606
- Current selection: Old Yeller
- Status: Streaming - 17% complete

Requested media content 608

User 1
```
Classic rock song 4
Country playlist 2
```

Tim
```
Fighters season 3 episode 10
The Great Outdoors
Tim's pop playlist
```

Rachel
```
Girl Stuff
Madonna 5
Melodies - No more
Melodies - Just right
Notting Hill
```

610
- User 1 device | Car DVD/stereo
- Tim Device | Rear TV
- Rachel Device | Rachel's mp3 player

SYSTEM AND METHOD FOR UPDATING VEHICLE MEDIA CONTENT

BACKGROUND

The use of and development of communications has grown nearly exponentially in recent years. The growth is fueled by larger networks with more reliable protocols and better communications hardware available to service providers and consumers. Communications and media features for vehicles have also recently experienced many advances.

In particular, digital video entertainment systems and satellite radio provide many users options not available only a few years ago. Entertainment systems are valuable to drivers and passengers alike, but are particularly useful for entertaining children. The existing media services for vehicles may include high monthly service costs or may be limited to on-hand media content.

SUMMARY

One embodiment provides a system and method for updating media content for a vehicle. Media content for a vehicle may be received through a home network. The media content may be stored for playback by one or more devices of the vehicle. A selection of additional media content available through the home network listed in an index may be received. The additional media content selected from the index may be queued for download based on access to an available network. The available network may be searched for. The additional media content may be downloaded to the vehicle through the available network and the home network in response to detecting the available network.

Another embodiment provides a vehicle system for updating media content. The vehicle system may include a transceiver operable to communicate media content with one or more wireless networks and one or more media devices within the vehicle. The vehicle system may further include a signal indicator in communication with the transceiver. The signal indicator may be operable to indicate the accessibility of the one or more wireless networks to the vehicle system. The vehicle system may further include a user interface in communication with the transceiver. The user interface may be operable to receive selections of the media content from an index of media content available for download through a home network. The user interface may be further operable to distribute the media content to the one or more media devices. The vehicle system may further include a memory in communication with the transceiver. The memory may be operable to queue the media content selected to be downloaded from the home network. The memory may be further operable to store the media content for playback.

Yet another embodiment includes a vehicle system. The vehicle system may include a processor for executing a set of instructions and a memory for storing the set of instructions. The set of instructions may be configured to receive a selection of media content available through a home network listed in an index, queue the media content selected from the index for download based on access to an available network, search for the available network, download the additional media content through the available network to the vehicle system from the home network in response to detecting the available network, and stream the additional media content to one or more devices in communication with the vehicle system.

BRIEF DESCRIPTION OF THE DRAWINGS

Illustrative embodiments of the present invention are described in detail below with reference to the attached drawing figures, which are incorporated by reference herein and wherein:

FIG. 6 is a pictorial representation of a user interface for updating media content for a vehicle in accordance with an illustrative embodiment.

DETAILED DESCRIPTION OF THE DRAWINGS

An illustrative embodiment provides a system and method for synchronizing media content between wireless networks and a vehicle. The synchronization may be performed automatically or manually based on user input. An illustrative embodiment may allow a user to access media content that has already been purchased or to retrieve new media content based on available wireless networks. In particular, the vehicle may download media content from a home network and remote wireless networks as the vehicle moves from one location to another. As a result, the user may access media content that has already been purchased through a home network without incurring more expenses. The media content are electronic files that may be played or accessed from integrated vehicle devices or external devices within the vehicle. The media content may include any number of data files, pictures, music, videos, games, slideshows, podcasts or other audio, video, or media content.

Figure 1:
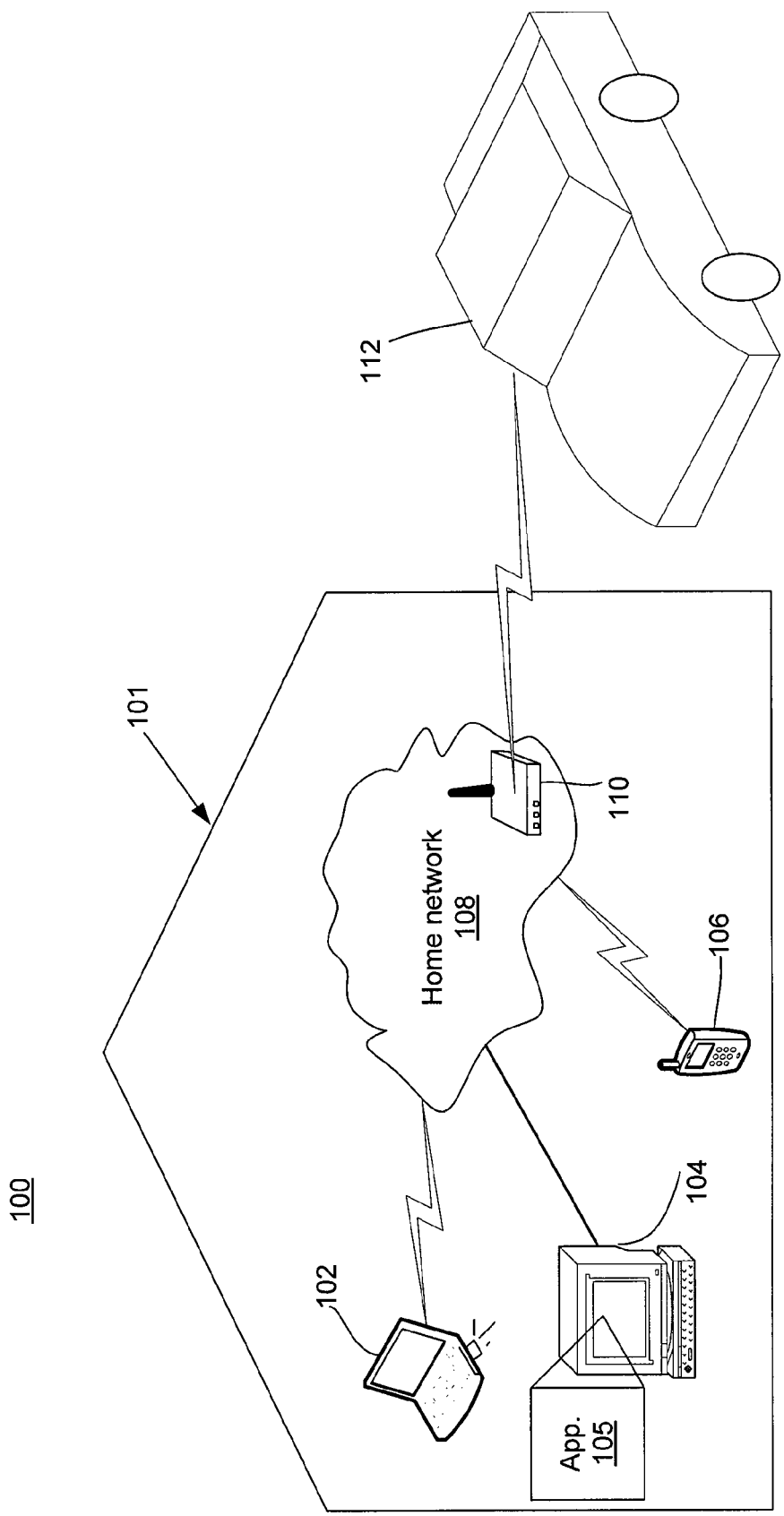
FIG. 1 is a pictorial representation of a home communications environment in accordance with an illustrative embodiment.

FIG. 1 is a pictorial representation of a home communications environment 100 in accordance with an illustrative embodiment. The home communications environment 100 is a location or environment in which synchronization of media content may occur. The home communications environment 100 may include any number of devices, elements or configurations. In one embodiment, the home communications environment 100 includes a home 101, a laptop 102, a computer 104 executing an application 105, a wireless device 106, a home network 108, a wireless router 110, and a vehicle 112.

The home 101 is one embodiment of a location where the vehicle 112 is frequently located. The home 101 may be the residence of the user and may further include a garage, car port, addition, or other designated parking space or structure. In another embodiment, the home 101 may be a place of business, school, organization, facility, designated space, or other location suitable for parking or temporarily storing the vehicle 112.

The laptop 102 and the computer 104 are personal computing devices that may be utilized by the user for data processing, digital or packet communications, executing applications, or performing any other computing or communications related tasks. In one embodiment, the laptop 102, the computer 104, and the wireless device 106 may execute or run the application 105. The application 105 is a set of instructions or programs configured to manage the media content that may be accessed by the vehicle 112 from any of the devices or connections in communication with the home network 108. The application 105 may be a graphical user interface (GUI) that manages access and playback of media content from numerous devices. For example, a user may download new music content to the laptop 102 through a GUI of the application. The user may further access the application 105 to index the new music files and make the music available to the vehicle 112 through the home network 108.

In one embodiment, the application 105 may be used across multiple computing and communications platforms and devices. The application 105 may be utilized on the computer 104 to retrieve new media content. The application 105 may then be executed by the systems of the vehicle 112 to synchronize the newest copy of the index, as well as selected media content. The application 105 may also be executed by a gaming device or cell phone within or connected to the vehicle 112 to request additional media content accessible through the home network 108.

In one embodiment, the application 105 may index all media content that may be streamed from the devices in communication with the home network 108. The index is a file listing media content available through a data connection to the home network 108. For example, the index may list the name and type of the media content, the date initially retrieved, the device the content may be downloaded from, and other information or data about the media content. The index may be automatically downloaded by the vehicle 112 any time the vehicle 112 is in communication with the home network 108 through the wireless router 110. For example, each night when a user parks the vehicle 112 in a garage of the home 101, the newest or most updated version of the index of media content may be downloaded to the systems of the vehicle 112.

The wireless device 106 is a communications device suitable for wireless communication. The wireless device 106 may be a cell phone, Blackberry® personal digital assistant (PDA), evolution-data optimized (EVDO) card, or other device suitable for communications with the home network 108 or other wireless networks.

The home network 108 is the network access, devices, communications features, and communications standards as transmitted and received by the wireless router 110. The home network 108 may be available to one or more communications devices communicating with the wireless router 110. For example, the home network 108 may be a Wi-Fi network that enables the devices of the home communications environment 100 to access a network connection. The wireless router 110 may further access any number of network connections or networks through a data or packet connection. For example, a cable connection, digital subscriber line (DSL), fiber optic or satellite connection may provide the wireless router 110 a connection to the internet and any other number of private or public networks.

In another embodiment, the home network 108 may represent Bluetooth or WiMAX signals available to the devices of the home communications environment 100 through the wireless router 110. The vehicle 112 may also communicate with the home network 108 through an Ethernet connection, powerline network or other hard wired network connection. The home network 108 may include a single device, such as a server, that manages the distribution of synchronization of media content to the vehicle 112 from the home network 108.

The vehicle 112 is a personal transportation device. In one embodiment, the vehicle 112 is a cat. In another embodiment, the vehicle 112 may be a truck, bus, scooter, bicycle, boat, train, or other transportation device suitable for transporting one or more users from one point to another. The vehicle 112 may include any number of integrated and external systems. For example, the vehicle 112 may include a global positioning system (GPS), stereo, environmental controls, locking system, engine and operations systems, and other systems, functions, and devices commonly integrated with a personal transportation device. The vehicle 112 may also include or carry any number of external devices that may be accessed within the vehicle 112. For example, individual occupants or users may bring mp3 players, cell phones, laptops, digital video disk (DVD) players, gaming systems, or other similar electronic devices.

A centralized system or device operating within the vehicle 112 may communicate with both the internal and external devices of the vehicle 112, as well as available wireless networks. In one embodiment, the vehicle 112 may access and retrieve media content from the laptop 102, computer 104, and wireless device 106 through the home network 108. For example, the vehicle 112 may retrieve music files from the laptop, movie, picture, and audio recordings from the computer 104 and a number of podcasts from the wireless device 106. The media content downloaded or uploaded to the vehicle 112 may be selected in any number of ways. In one embodiment, the user may access the application 105 to select media content to be downloaded to the vehicle 112 the next time the vehicle 112 is in communication with the home network 108.

In another embodiment, the systems of the vehicle 112 may display the index to one or more users within the vehicle 112 that may allow the one or more users to select the media content to be downloaded to the vehicle 112. In yet another embodiment, a web portal available through the home network 108 may allow one or more users to specify the media content downloaded to the vehicle 112. For example, the communications service provider utilized by the user may provide a web portal for storing media content or indexing media available through the home network 108. The media content and the index may be displayed to the user regardless of whether the vehicle 112 has access to a wireless network. For example, a memory or cache within the vehicle may store the index for subsequent selection and queuing of media content.

Figure 2:
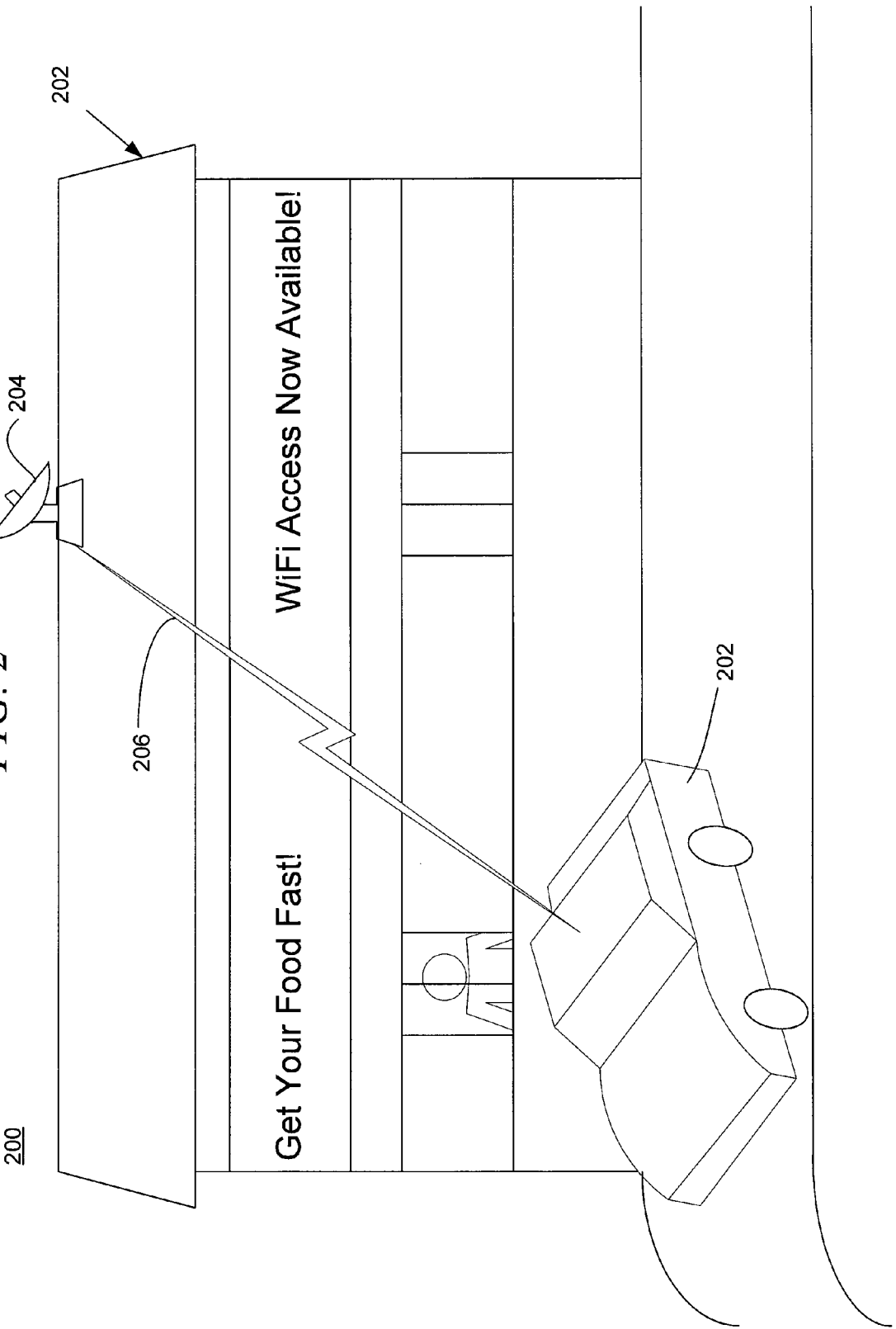
FIG. 2 is a pictorial representation of a communications environment in accordance with an illustrative embodiment.

FIG. 2 is a pictorial representation of a communications environment in accordance with an illustrative embodiment. The remote communications environment 200 is a building, organization, or other location remotely located from a home communications network. The remote communications environment 200 may include a location 202, a transceiver 204, a wireless signal 206, and a vehicle 208. The vehicle 208 is a particular implementation of the vehicle 112 of FIG. 1.

The location 202 is a building, business, or organization that provides a communications network. In one embodiment, the location 202 utilizes a transceiver 204 to wirelessly transmit and receive wireless signals 206 between the transceiver 204 and the vehicle 208. The transceiver 204 is a communications device configured to send and receive the wireless signals 206. The transceiver 204 may be in communication with one or more network connections, such as a dedicated cable internet connection. For example, the transceiver 204 may be an antenna, hardware, and software for sending and receiving data signals to and from the vehicle 208 and any number of other computing or communications devices.

The following example is provided to further describe the operations of an embodiment. The location 202 may be a restaurant with a drive-thru. The vehicle 208 may be occupied by a family taking a 10-hour road trip from their home to a vacation destination. As the family travels in the vehicle 208 they may quickly view all of the media content that they have brought for the trip. As a result, users within the vehicle 208 may desire to listen or view additional media content that is not currently available from the vehicle 208. In one embodiment, each user may select or queue media content from an index for retrieval through devices in communications with a home network. The queued media content may be stored by the vehicle 208 in a list, database, or file until an available network or network connection becomes available to the vehicle 202.

The availability of a wireless network or network connection may depend on the quality of service, connection speed, signal strength, and any number of factors indicating the quality of the signal. The vehicle 208 may be stopped at the location 202 in order to buy food for lunch. During the time in the drive-thru, users within the vehicle 208 may be provided an identifier, network key, or access to a remote network available through the transceiver 204. For example, during or after ordering, the users or operators within the location 202 may provide the user within the vehicle 202 an identifier for communicating with the transceiver 204. Alternatively, the vehicle 202 may be able to connect without any security measures. The vehicle 208 may automatically establish a network connection through the wireless signals 206 in order to begin downloading additional media content to the vehicle 208.

As a result, during the time the vehicle 208 is in close proximity to the location 202 and the corresponding remote network, the additional media content may be downloaded to the vehicle 208. The vehicle 208 may then further distribute or playback the media content to integrated or external devices within the vehicle 208. In another embodiment, one or more users within the vehicle 208 may be presented information or data relating to the availability of the wireless signals 206 and an associated remote network. The users may utilize this information to manually initiate a follow-up synchronization between media content accessible from the home network and the vehicle 202.

Figure 3:
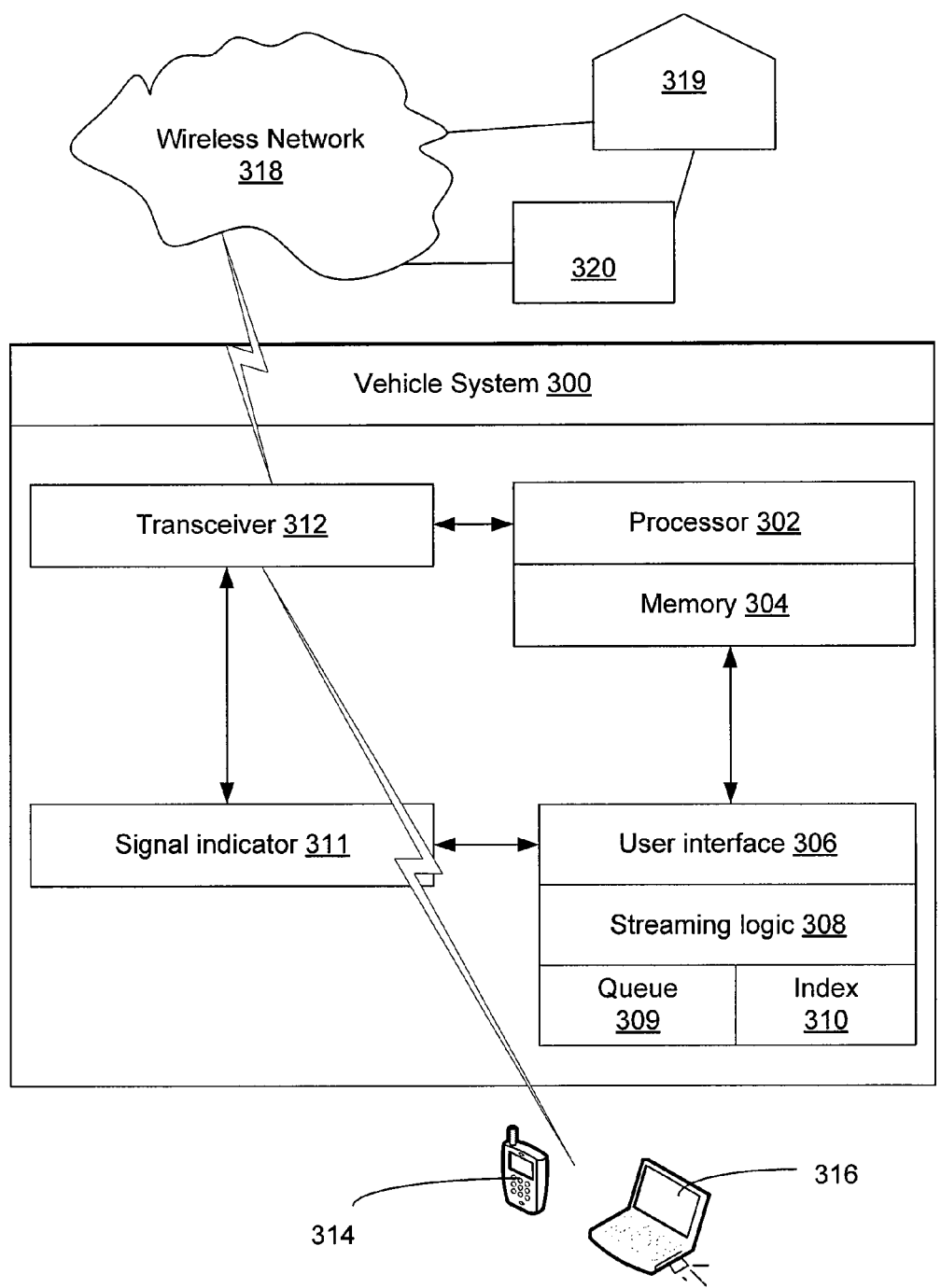
FIG. 3 is a block diagram of a vehicle system in accordance with an illustrative embodiment.

FIG. 3 is a block diagram of a vehicle system in accordance with an illustrative embodiment. The vehicle system 300 is a particular implementation of systems of the vehicle 208 of FIG. 2. In one embodiment, the vehicle system 300 may include a processor 302, a memory 304, a user interface 306, streaming logic 308, a queue 309, an index 310, a signal indicator 311, and a transceiver 312. The vehicle system 300 may further communicate with external devices 314 and 316, a wireless network 318, a home network 319, and a web portal 320. The vehicle system 300 includes the computing and communications hardware, software firmware, and other features of the vehicle.

The external devices 314 and 316, transceiver 312, wireless network 318, home network 319, and web portal 320 may communicate using communications protocols, such as time division multiple access (TDMA), code division multiple access (CDMA), global systems for mobile (GSM) communications, personal communications systems (PCS), WLAN, WiMAX, Bluetooth or other frequently used cellular and data communications protocols and standards.

The processor 302 is circuitry or logic enabled to manage the vehicle system 300 and control execution of a set of instructions. The processor 302 may be a microprocessor, digital signal processor, central processing unit or other device suitable for controlling the operation of the vehicle system including one or more hardware and software elements, executing software, instructions, programs and applications, converting and processing signals and information, and performing other related tasks. The processor 302 may be a single chip or integrated with other computing or communications elements. The processor 302 may also execute a set of software modules to initiate communication between the transceiver and an available wireless network.

The memory 304 is a hardware element, device, or recording media configured to store media content, data, and other information for subsequent retrieval or access at a later time. The memory 304 may be static or dynamic memory. The memory 304 may include a hard disk, random access memory, cache, removable media drive, mass storage, or other storage suitable for recording data, instructions, and information. In one embodiment, the memory 304 and processor 302 may be integrated. The memory may use any type of volatile or non-volatile storage techniques and mediums. The memory 304 may include hardware or software for implementing voice commands and voice recognition. In one embodiment, the memory 304 may store user preferences, settings, and configurations. For example, the memory 304 may store access information for one or more public or private wireless networks. The memory 304 may further include a database for storing a queue of requested media content.

In one embodiment, the vehicle system 300, and particularly, the processor 302 may execute a set of instructions stored in the memory 304 in order to implement the features and methods of an embodiment, as herein described. In another embodiment, the streaming logic 308 or other element of the vehicle system 300 may include hardware or software settings that independently implement the features and services herein described. The vehicle system 200 may include any number of other computing and communications components including busses, cards, wires, integrated circuits, sockets, adapters, modules, and other similar elements that are not explicitly shown herein for purposes of simplicity.

In one embodiment, the memory 304 may be partitioned for one or more users or devices. For example, the memory 304 may store media content for one or more user profiles. The separate user profiles within the memory 304 may be accessed by the user interface 306 or external devices 314 and 316 to retrieve user specific media content. In one embodiment, the vehicle system 300 may be the central interface to the systems of the vehicle.

In another embodiment, the vehicle system 300 may be an externally connected device. For example, the vehicle system 300 may be a GPS system that may be powered from a cigarette lighter or power port of the vehicle. The vehicle system 300 may also be another computing and communications device that may be integrated with the vehicle or externally connected. In yet another embodiment, the vehicle system 300 may be a thumb drive that may be connected to a stereo or other interface of the vehicle.

The user interface 306 is the system for providing user input and receiving information and media content available through the vehicle system 300. In one embodiment, the user interface 306 may include or be integrated with media players, audio players, GPS, stereo, environmental controls, and other similar systems. For example, the user interface 306 may be a touch screen that displays vehicle information including environmental conditions, location, global positioning information, as well as media content.

In another embodiment, the vehicle system 300 may utilize voice recognition or speech-to-text conversion to receive commands from one or more users. For example, the vehicle system 300 may include multiple microphones and speakers, as well as displays. Each user may toggle a switch or select a button in order to provide a voice command. For example, the user may say "retrieve Green Day playlist" to queue Green Day's playlists available to the user through the home network 318. The user interface 306 may include any number of default or programmable voice commands that may be utilized by the users. The voice commands may also be sent to the vehicle system 300 by the external devices 314 and 316. The voice commands may be received and converted to a command signal by the external devices 314 and 316 or the voice commands may be sent directly to the vehicle system 300 for translation and implementation.

The streaming logic 308 is the logic, circuitry, and instructions for retrieving and storing media content within the vehicle system 300. The streaming logic 308 may be discrete logic elements, an integrated circuit, programmable logic, application logic, or other logic systems, devices, or elements for controlling the vehicle system 300. The streaming logic 308 may be digital logic that is configured by the user to store media content in the memory 304. In another embodiment, the streaming logic 308 is a program application that may be executed by the processor 302 to synchronize, store, delete, and otherwise manage, the media content within the vehicle system 300. The streaming logic 308 may utilize encryption, identifiers, or other security protocols to access the home network 319.

The home network 319 may include devices and media content imported, downloaded, rented, purchased, shared, or otherwise managed by one or more users. Users with access to the home network 319 may obtain media content through any number of processes and media content providers. In one embodiment, the streaming logic 308 may be configured to retrieve media content directly from the home network 319 or through the wireless network 318. The user may utilize an application executed by the vehicle system 300 or other devices to select media content for download to the vehicle system. The application may update the index 310 based on the acquisition or removal of media content from the home network 319. For example, the user may check boxes associated with media content to synchronize the selected media content to the vehicle system once the home network 319 or the wireless network 318 are detected.

As shown, the streaming logic 308 may further include the queue 309 and the index 310. The queue 309 is an electronic file that lists media content to be retrieved by the vehicle system 300. In one embodiment, the queue 309 may be integrated with the memory 304. The queue 309 may receive user input and compile requests for additional media content and stores the requests for subsequent retrieval based on availability to a communications network. For example, the queue may be a list or electronic file storing the media content requests.

The index 310 is a list of the media content that may be available to the vehicle system 300 based on an available network connection. In one embodiment, the index 310 may list all media content available through a home network connection. In another embodiment, the index 310 may list media content not yet available through the home network that may still be retrieved based on access to a communications network. In one embodiment, the queue 309 and the index 310 may be displayed to one or more users through the user interface 306. Alternatively, the queue 309 and the index 310 may be streamed or displayed to the external devices 314 and 316.

The vehicle system 300 may be configured to require administrative approval of all media content that may be downloaded. For example, an administrator may access the user interface 306 to accept or deny requests stored within the queue 309. For example, a child may have selected media content that is not appropriate or that is too large to be easily downloaded that may be denied by the administrator. In another embodiment, the user interface 306 may be utilized to prioritize the media content based on the files that are to be downloaded first when a communications network becomes available. For example, the queue 309 may list 20 different files and an administrator may access the user interface 306 to designate the order in which the files within the queue 309 are downloaded.

In one embodiment, the queue 309 or streaming logic 308 may be configured to send requests to an application or program stored on a web server or on the home network. For example, the user interface 306 may display media content that is commercially available for download. The media content may then be downloaded to the home network 319 and associated devices for retrieval by the vehicle system. For example, a request from the vehicle system 300 for a new song may be initiated by a copy of iTunes® running on a home computer. The new song may be downloaded to the home computer with access to the home network 319 or may be downloaded directly to the vehicle system 300. Any number of commercial services may be directly or indirectly accessed through the vehicle system 300.

The signal indicator 311 is a device configured to display information regarding the availability of a wireless network. In one embodiment, the signal indicator 311 may display the name, connection speed, encryption, access information, cost, and other data and information associated with a network, such as the wireless network 318. The signal indicator 311 may help a user to determine whether the media content within the queue 309 may be quickly retrieved or whether a better wireless network or higher quality signal may be required to download the content.

The transceiver 312 is a communications device of the vehicle system 300 configured to communicate with the external devices 314 and 316, as well as the wireless network 318. For example, the transceiver 312 may be a wireless card, cell phone or GRMS transceiver, satellite antenna, or other similar device. The transceiver 312 may be configured to actively search for and then communicate through wireless signals. In one embodiment, the one or more users may link the transceiver 312 with the external devices 314 and 316 utilizing an active synchronization mode, identifiers or other linking, or association processes and technologies. The transceiver 312 may also actively search for other available networks, such as the wireless network 318. The signal strength, quality and threshold of the wireless network 318 may be displayed by the signal indicator 311. In one embodiment, the wireless network 318 is a Wi-Fi network available from a public library. In another embodiment, the wireless network 318 may be a cellular, data or packet network configured for communication with the transceiver 312.

The wireless network 318 may further communicate with the home network 319 and the web portal 320. The home network 319 is a particular implementation of the home network 108 of FIG. 1. The web portal 320 may be configured to receive requests through the wireless network 318 as generated by the vehicle system 300. The web portal 320 may further manage the transmission of selected media content from the home network 319, the internet, and other sources to the vehicle system 300.

The vehicle system 300 may playback the media content to one or more users through the user interface 306 while stopped or during travel. In one embodiment, the user interface 306 may include a number of media/display consoles, such as in the front and back of a minivan that may display separate content to one or more users. In one embodiment, the user interface 306 may further include speakers, headphones, or other similar audio devices. The user interface 306 may also include any number of ports, connectors, or other elements for connecting media devices to the user interface 306. For example, each user may have a port that may receive a connector of a media device for displaying and playing media content to a user. Similarly, the external devices 314 and 316 may connect to the vehicle system 300 through a hardwire connection, such as an Ethernet jack, FireWire, universal serial bus (USB) cable, RCA jacks, or other similar media interfaces. In one embodiment, the transceiver 312 may communicate with the external devices 314 and 316 utilizing a short range radio frequency signal, such as Bluetooth.

Figure 4:
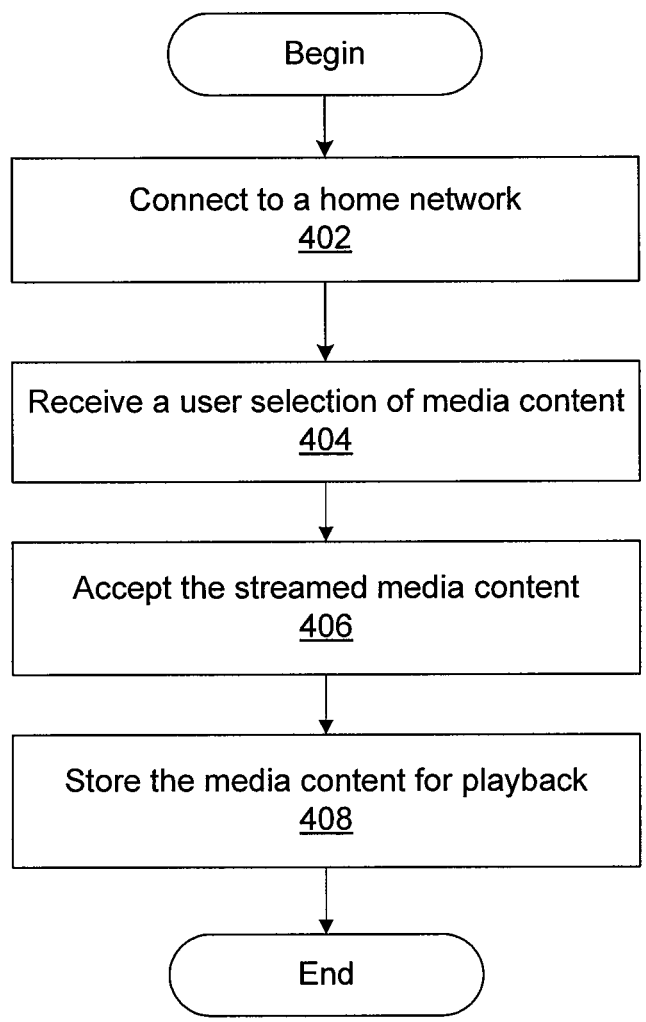
FIG. 4 is a flowchart of a process for receiving media content for a vehicle from a home network in accordance with an illustrative embodiment.

FIG. 4 is a flowchart of a process for receiving media content for a vehicle from a home network in accordance with an illustrative embodiment. In one embodiment, the process of FIG. 4 may be implemented by an integrated or external vehicle system.

The process may begin by connecting to a home network (step 402). The home network may be generated by a wireless router or base station and may include or communicate with, manage, or access any number of personal computing or communications devices, such as servers, routers, modems, adapters, wireless devices, mp3 players, or other similar electronic equipment configured to communicate within the home network. The home network may be a combination of wired and wireless connections. For example, a portion of the home network may be an Ethernet network and another portion may be a Wi-Fi network. The home network may retrieve media content from any number of sources including manual upload, media and commercial content providers, peer-to-peer networks, and other similar sources.

Next, the vehicle system receives a user selection of media content (step 404). In one embodiment, the user selection may be entered through a user or graphical user interface of the vehicle. In another embodiment, the user selection may be transmitted to the vehicle directly through a hardwired or wireless connection. Alternatively, the user selection may be implemented utilizing a communications or computing device that is not directly in communication with the vehicle. For example, a user may select media content for download to the vehicle from a personal computer executing an application configured to synchronize media content to the vehicle. Alternatively, the user selection may be implemented utilizing a wireless device that accesses a portal in communication with the home network.

Next, the vehicle system accepts the streamed media content (step 406). For example, the media content may be transmitted through the home network. In another embodiment, the user may connect a USB thumb drive, mp3 player, or other physical device to the vehicle system in order to retrieve the selected media content. The vehicle system may be configured to automatically download the user selected media content in response to detecting the home network. Alternatively, the user may be required to activate a synchronization command.

The vehicle system stores the media content for playback (step 408). The media content may be stored in a memory or database of the vehicle. In one embodiment, the media content may be stored based on a user profile or device associated with the media content. As a result, each user device may more efficiently access the media content based on their request. Similarly, based on user preferences, options, and configurations of the vehicle system, any of the internal or external devices within the vehicle may retrieve and access the media content. Alternatively, the media content may include playback restrictions, permissions, or other information that is user specified or specified by a media provider limiting or controlling the playback of the retrieved media content.

Figure 5:
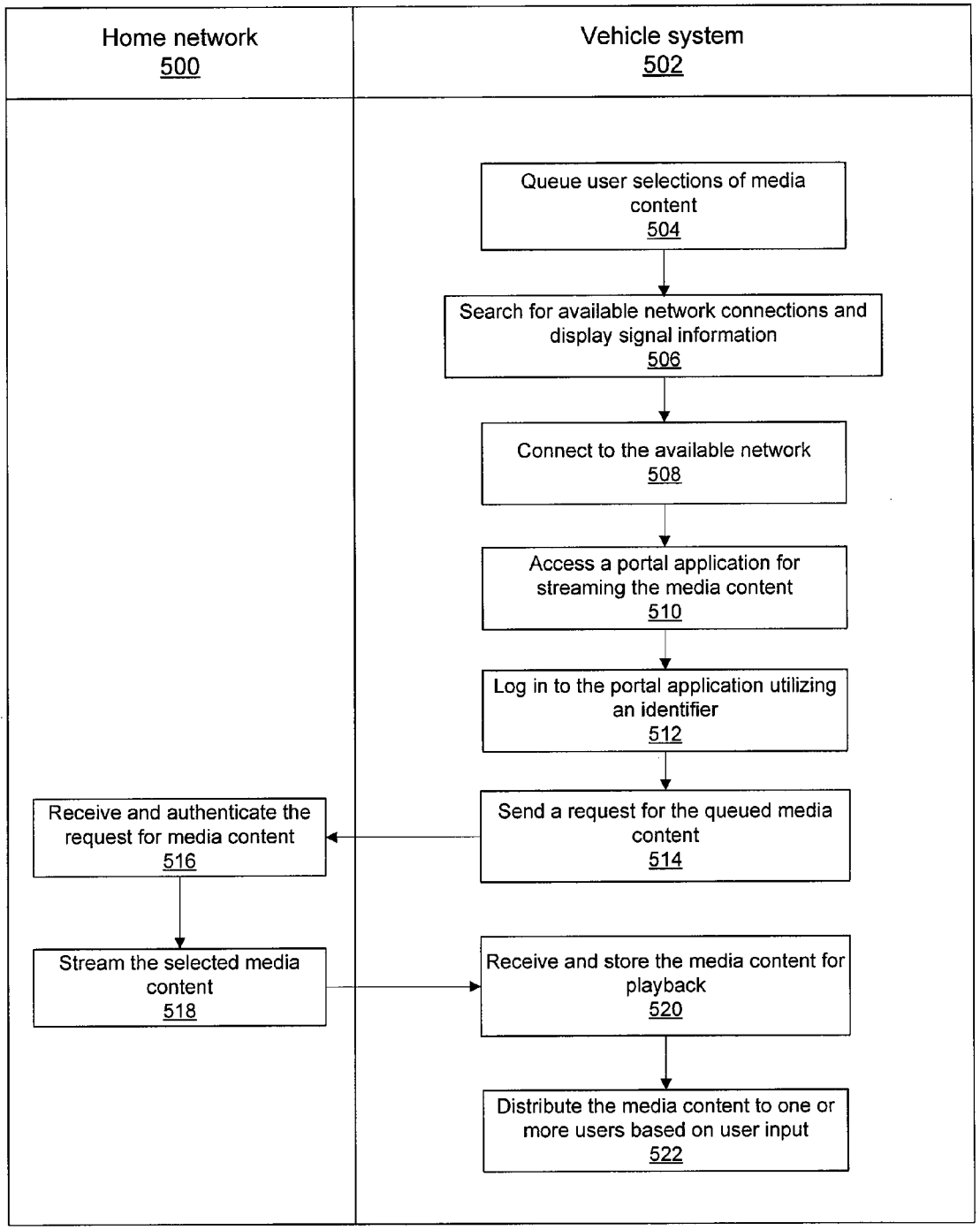
FIG. 5 is a flowchart of a process for remotely updating media content for a vehicle in accordance with an illustrative embodiment.

FIG. 5 is a flowchart of a process for remotely updating media content for a vehicle in accordance with an illustrative embodiment. The process of FIG. 5 may be implemented by a home network 500 and a vehicle system 502. The vehicle system 502 may also communicate with one or more available wireless networks not explicitly shown in FIG. 5.

The process of FIG. 5 may begin with the vehicle system 502 queuing user selections of media content (step 504). The user selections may include requests from one or more users. For example, the vehicle system 502 may display an index of media content available to the one or more users through the home network 500. The index may display audio content, video content, files, podcasts, and other electronic media content. The user selections may be requests received directly by the vehicle system 502 through an interface. In another embodiment, the user selections may be text messages, chat messages, or other electronic requests transmitted from an external device within the vehicle to the vehicle system 502.

Next, the vehicle system 502 searches for available network connections and displays signal information (step 506). During step 506, the vehicle system 502 may periodically or constantly search for available wireless networks. For example, every 30 seconds the vehicle system 502 may search for an available wireless network. In one embodiment, the vehicle system 502 may only search for available network connections if there is queued content or if the vehicle is traveling or occupied. As a result, the vehicle system 502 will not use additional power to search for network connections if the vehicle is unoccupied, not moving locations, or there is no media content that is queued for download.

Next, the vehicle system 502 connects to the available network (step 508). The vehicle system 502 may determine whether the network is available based on characteristics of the communications signal, for example, a required signal strength, speed, loss ratio, noise level, or other parameters and characteristics of the communications signal.

The vehicle system 502 accesses a portal application for streaming the media content (step 510). The portal application may be a web portal available to the vehicle system 502 through a network connection. In one embodiment, the portal is provided by a communications service provider. For example, the communications service provider may provide any number of applications for the vehicle system 502 and devices within the home network 500 for managing media content communicated between the two systems. In another embodiment, the vehicle system 502 may communicate directly with the home network 500 or specific devices within the home network without communicating through a portal or other intermediary device, portal, or interface. For example, an IP address, username, and password may be utilized to establish a connection between the home network 500 and the vehicle system 502 for transmission of additional media content.

Next, the vehicle system logs in to the portal application utilizing an identifier (step 512). The identifier may be a vehicle identification number, user name, password, account number, nickname, IP address, phone number, or other similar information or data. The vehicle system 502 sends a request for the queued media content (step 514). The request may list all of the media content selected by the one or more users. In one embodiment, the queued media content may have been prioritized by the users or by an administrator of the vehicle system 502. As a result, if the vehicle system 502 is unable to connect to the home network 500 for a substantial amount of time only the most important media content is downloaded to the vehicle system 502, rather than a random download of media content.

The home network 500 receives and authenticates the request for media content (step 516). In one embodiment, a personal computer in communication with the home network 500 may authenticate the request by verifying the identifier or other information. Next, the home network 500 streams the selected media content (step 518). As previously described, the home network 500 may include any number of devices that function as a single unit to form the home network 500. As a result, the media content may be retrieved from any number of computers, servers, wireless devices, televisions, set-top boxes, television forwarding devices, laptops, or other similar computing or communications devices.

Next, the vehicle system 502 receives and stores the media content for playback (step 520). The media content may be automatically cached or written into memory as it is received from the home network 500. Similarly, the media content may be automatically parsed to any number of partitions or folders within a memory of the vehicle system 502 for playback to specific users or devices. Next, the vehicle system 502 distributes the media content to one or more users based on user input (step 522). Once the media content has been uploaded to the vehicle system 502 the one or more users may select at any time to play or retrieve the media content. For example, two hours into a four-hour drive a teenage user may select to download a game to her personal gaming system within the vehicle and as a result the vehicle system 502 distributes the game from the stored media content.

FIG. 6 is a pictorial representation of a user interface for updating media content for a vehicle in accordance with an illustrative embodiment. The user interface 600 of FIG. 6 is one embodiment of an interface or application that may be displayed by a vehicle system, internally or externally connected device, or a personal computing or communications device of a home network. In one embodiment, the user interface 600 may include Sections 602-610. The user interface 600 and particularly the sections 602-610 may include any number of buttons, icons, dropdown menus, hyperlinks, or other display and interactive elements.

Section 602 may allow one or more users to provide an identifier for accessing a home network. The identifier may include a user name, password, network access key or code, account number, or other similar information.

Section 604 may display connection information. For example, section 604 may list the name of the wireless network, the vehicle system it is connecting to, and a signal strength for the wireless network. Section 604 may also list other related network performances, and characteristics including speed, throughput, errors, encryption, and other similar information.

Section 606 may display information regarding a current selection. For example, a movie, such as Old Yeller may be downloading to the vehicle system. Section 606 may display the amount of the movie that has been received and estimated time for the movie to be downloaded and other similar information.

Section 608 may display the media content queued by any number of users. For example, the queued or requested media content may include content compiled from three users. Similarly, section 608 may also display an index of the media content available through a home network. One or more dropdown lists may allow a user to select media content by file type, including songs or audio files, movies, pictures, or other content that has been uploaded to a web portal or that is available through a home network. Section 608 may also list a device within the home network that currently stores the requested media content.

Section 610 may list an association of each user and device. For example, a number of the listed devices may be for integrated systems such as a car, DVD, or entertainment system. Similarly, another user may be controlling or managing a rear television within the vehicle. Yet another user may be utilizing an mp3 player that is wirelessly communicating with the vehicle system. As a result, each of the users may download the media content once it has been retrieved by the vehicle system.

The illustrative embodiments may provide a system and method for more effectively managing media content available from or through a vehicle. Synchronization and requests for additional media content may be effectively managed through an integrated or externally connected vehicle system. As a result, one or more users may more comfortably pass time within the vehicle based on the availability of media content.

The previous detailed description is of a small number of embodiments for implementing the invention and is not intended to be limiting in scope. The following claims set forth a number of the embodiments of the invention disclosed with greater particularity.

What is claimed:

1. A method for updating media content for a vehicle, the method comprising:
   receiving media content for a vehicle through a home network;
   storing the media content for playback by one or more devices of the vehicle;
   receiving a selection of additional media content available through the home network while the home network is unavailable, the selection of additional media content indicating existing media content on the home network, listed in an index, and new media content to be acquired that is not on the home network;
   queuing the additional media content selected for download based on access to an available network other than the home network, the additional media content including a priority established based on user input for each of the additional media content;
   searching for the available network;
   displaying, with a signal indicator, information about the available network, the information comprising a connection speed of the available network and a cost of the available network;
   automatically downloading the additional media content through the available network from the home network utilizing the priority established by the user input to a centralized system of the vehicle in response to detecting the available network, wherein the centralized system of the vehicle is a central interface to systems of the vehicle, wherein the download of the new media content is initiated through the home network before being downloaded to the centralized system; and
   distributing the additional media content from the centralized system to the one or more devices including one or more integrated vehicle systems and external vehicle systems authorized to receive the additional media content, while the vehicle is in operation.

2. The method according to claim 1, further comprising:
   compiling the index based on the media content available through devices in communication with the home network.

3. The method according to claim 1, further comprising:
automatically updating the index stored by the vehicle in response to the media content available through devices in communication with the home network changing and the vehicle being directly or indirectly in communications with the home network.

4. The method according to claim 2, wherein the home network, the centralized system, one or more integrated vehicle systems, and the external vehicle systems include an application executed for receiving the selection and communicating the additional media content between the home network and the vehicle.

5. The method according to claim 4, wherein the additional media content includes content accessible by the home network through one or more communications networks though not yet downloaded to the home network, and wherein the content is downloaded to the home network for communication to the vehicle in response to the content being included in the selection.

6. The method according to claim 5, wherein the selection is received utilizing an interface of the application.

7. The method according to claim 5, wherein the additional media content in the selection must be approved by an administrator before being queued.

8. The method according to claim 1, wherein the additional media content includes music and movie files.

9. The method according to claim 1, further comprising:
authenticating that the vehicle is authorized to access the media content and the additional media content.

10. The method according to claim 1, further comprising:
parsing the additional media content to one or more partitions or folders for performing the distributing in response to each user utilizing the one or more devices generating a portion of the selection.

11. The method according to claim 1, further comprising:
displaying the progress of the additional media content being downloaded to the vehicle.

12. A vehicle system for updating media content, the vehicle system comprising:
a transceiver operable to communicate media content with one or more wireless networks and one or more media devices within the vehicle;
a signal indicator in communication with the transceiver, the signal indicator operable to indicate the accessibility of the one or more wireless networks to the vehicle system and to display information about at least one available network, the information comprising a connection speed of the available network and a cost of the available network;
a user interface in communication with the transceiver, the user interface operable to receive selections of the media content indicating existing media content on the home network, listed in an index, and new media content to be acquired that is not on the home network, available for remote download through a home network, the user interface is operable to receive a priority for downloading each of the selections in response to establishing a connection with the one or more wireless networks, the user interface further operable to distribute the media content to the one or more media devices while the vehicle is in operation; and
a memory in communication with the transceiver, the memory operable to queue the media content selected to be downloaded through the one or more wireless networks remotely communicating with the home network, the memory further operable to store the media content for playback in response to the transceiver downloading the media content included in the selections through the one or more wireless networks, the selections being automatically downloaded according to the priority for each of the selections in response to the one or more wireless networks being available, wherein the download of the new media content is initiated through the home network before being downloaded by the transceiver;
wherein the vehicle system is a central interface to systems of the vehicle.

13. The vehicle system according to claim 12, wherein the one or more media devices include devices integrated with the vehicle and external devices in communication with the transceiver.

14. The vehicle system according to claim 12, wherein the transceiver is operable to update the index stored by the memory in response to the media content available through devices in communication with the home network changing and the vehicle being in communications with the one or more wireless networks, and wherein the index lists media content that is retrievable by the home network though currently unavailable.

15. The vehicle system according to claim 12, wherein the user interface is operable to approve the queued media content.

16. The vehicle system according to claim 12, wherein the memory automatically parses the media content into one or more partitions or folders for performing the distributing in response to each user generating a portion of the selection.

17. A vehicle system comprising:
a processor for executing a set of instructions; and
a memory for storing the set of instructions, wherein the set of instructions are configured to:
receive one or more selections of media content remotely available through a home network, the one or more selections of media content indicating existing media content on the home network and listed in an index, and new media content to be acquired that is not on the home network;
queue the one or more selections of media content for download based on access to an available network, the one or more selections of media content including a priority established based on user input;
search for the available network;
display, with a signal indicator, information about the available network, the information comprising a connection speed of the available network and a cost of the available network;
download the one or more selections of media content through the available network to the vehicle system remotely from the home network utilizing the priority in response to detecting the available network, wherein the download of the new media content is initiated through the home network before being downloaded to the vehicle system; and
stream the one or more selections of media content to one or more devices in communication with the vehicle system according to the selection generated by one or more users, while the vehicle is in operation;
wherein the vehicle system is a central interface to systems of the vehicle.

18. The vehicle system according to claim 17, wherein the set of instructions is further configured to:
display the media content that is retrievable through the home network by the available networks.

19. The vehicle system according to claim 17, wherein the set of instructions is further configured to:

update the index stored by the memory in response to the media content available through devices in communication with the home network changing and the vehicle being in communications with the home network.

20. The vehicle system according to claim 17, wherein the set of instructions further:
displays the progress of the additional media content being downloaded to the vehicle.

* * * * *